(12) United States Patent
Kolev

(10) Patent No.: US 6,374,114 B1
(45) Date of Patent: Apr. 16, 2002

(54) METHODS OF PROCESSING AND TRANSMITTING INCOMING CALL PAGES INCLUDING INFORMATION ALLOWING A DETERMINATION OF THE TIME ALLOWED FOR RESPONSE AND RELATED USER TERMINALS AND COMMUNICATIONS SYSTEMS

(75) Inventor: Javor Kolev, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/129,010

(22) Filed: Aug. 4, 1998

(51) Int. Cl.[7] .................................................. H04Q 7/20
(52) U.S. Cl. ........................ 455/458; 455/459; 455/550
(58) Field of Search ................................ 455/458, 459, 455/31.2, 31.3, 421, 414, 38.4, 38.5, 550, 561; 340/825.44

(56) References Cited

U.S. PATENT DOCUMENTS

| | | | | |
|---|---|---|---|---|
| 4,747,122 A | * | 5/1988 | Bhagat et al. | 340/825.44 X |
| 5,402,467 A | * | 3/1995 | Watanabe | 455/458 X |
| 5,414,750 A | * | 5/1995 | Bhagat et al. | 455/459 X |
| 5,541,976 A | * | 7/1996 | Ghisler | 455/426 |
| 5,594,776 A | | 1/1997 | Dent | 455/458 |
| 5,668,862 A | * | 9/1997 | Bannister et al. | 379/201 |
| 5,828,949 A | * | 10/1998 | Silver et al. | 455/38.3 |
| 5,854,984 A | * | 12/1998 | Buhrmann et al. | 455/550 |
| 5,924,044 A | * | 7/1999 | Vannatta et al. | 455/556 |
| 5,950,128 A | * | 9/1999 | Ghisler | 455/458 X |

FOREIGN PATENT DOCUMENTS

| | | | |
|---|---|---|---|
| GB | 2 253 972 A | 9/1992 | H04B/7/005 |
| WO | WO 96/31992 | 10/1996 | H04Q/7/38 |

OTHER PUBLICATIONS

International Search Report for PCT/US99/18879.

* cited by examiner

*Primary Examiner*—Tracy Legree

(57) ABSTRACT

A method of processing an incoming call page from a radiotelephone communications system at a mobile user terminal includes receiving the incoming call page from the radiotelephone communications system at the mobile user terminal, and determining a period of time within which the mobile user terminal can respond to the incoming call. An indication of the period of time within which the user terminal can respond to the incoming call is then provided to a user of the mobile user terminal. In addition, the incoming call page can be one of a predetermined number of incoming call pages addressed to the mobile user terminal in a sequence wherein each of the incoming call pages in the sequence includes information identifying the respective incoming call page within the sequence. Accordingly, the step of determining the period of time within which the mobile user terminal can respond to the incoming call can include determining the number of incoming call pages in the sequence to follow.

36 Claims, 4 Drawing Sheets

METHODS OF PROCESSING AND TRANSMITTING INCOMING CALL PAGES INCLUDING INFORMATION ALLOWING A DETERMINATION OF THE TIME ALLOWED FOR RESPONSE AND RELATED USER TERMINALS AND COMMUNICATIONS SYSTEMS

FIELD OF THE INVENTION

The present invention relates to the field of radiotelephone communications and more particularly to methods of transmitting and receiving incoming call pages in radiotelephone communications systems.

BACKGROUND OF THE INVENTION

In a conventional mobile radiotelephone communications system, communications are provided between one or more mobile user terminals, a wired communications system, and the radiotelephone communications system. In other words, a radio link between a mobile user terminal and the radiotelephone communications system can be used to support communications between the mobile user terminal and a second mobile user terminal, or between the mobile user terminal and a telephone on the wired communications system.

When a call is placed to the mobile user terminal, the radiotelephone communications system sends an incoming call page to the mobile user terminal over a control channel indicating the presence of an incoming call. Upon reception of this incoming call page by the mobile user terminal over the control channel, the user terminal and the radiotelephone communications system initiate a series of control communications to establish a link therebetween over a dedicated channel.

In particular, the Asia Cellular Satellite (AceS) proposed by Lockheed Martin Corporation and Ericsson Mobile Communications AB provides that a sequence of up to 5 incoming call pages be transmitted by the satellite system in indication of an incoming call. Moreover, a predetermined uniform delay is provided between each of the incoming call pages of the sequence and a period of time (longer than the predetermined uniform delay) is provided after the last page of the sequence within which the user can respond to the incoming call to establish a radiotelephone communications link.

Because the mobile user terminal may be unable to receive or respond to the initial incoming call page, however, a sequence of multiple incoming call pages may be sent. Furthermore, one or more of the sequence of incoming call pages may be sent at an increased power level (such as over a High Power Alert Channel) to increase the probability of being received by the mobile user terminal. Accordingly, the mobile user terminal can respond to the incoming call any time between the first and last pages of the sequence of pages as well as within the predetermined period of time provided after the last page of the sequence.

In particular, a mobile user terminal may be operating under disadvantaged communications conditions so that one or more of a sequence of incoming call pages are received, but the mobile user terminal is unable to immediately respond. For example, a mobile user terminal in a location, such as inside a building, providing disadvantaged communications may be able to receive one of the sequence of incoming call pages, such as a page in the sequence sent over a high power alert channel, but be unable to respond until taken to a location, such as outside the building, providing advantaged communications.

The time to respond to the page may expire while the user is attempting to get outside causing user frustration. Furthermore, it may be difficult to distinguish between different sequences of pages associated with closely spaced incoming calls if the user terminal does not receive all pages of each sequence.

SUMMARY OF THE INVENTION

It is therefore an object of the present invention to provide improved methods of transmitting and receiving incoming call pages and related user terminals and communications systems.

This and other objects are provided according to the present invention by including information in the incoming call pages which allows the receiving user terminal to determine a period of time available for response if communications cannot be established immediately. An indication of this period of time can then be provided to the user who is able to decide if there is sufficient time to try to move to a location which will allow communications to be established. For example, the mobile user terminal may be in a building when a high power incoming call page is received and may be unable to respond immediately because of interference due to the building. By moving outside within the period of time allowed for response, however, the mobile user terminal can respond to the incoming call. The frustration of moving outside the building to only then learn that the time for response has elapsed can thus be reduced. Moreover, one or more of the pages in a sequence can be missed without shortening the period allowed for response.

According to a first aspect of the present invention, the incoming call page from the radiotelephone communications system is received at the mobile user terminal. The period of time within which the mobile user terminal can respond to the incoming call is then determined, and an indication of this period of time is provided to the user. In addition, the incoming call page can be one of a predetermined number of incoming call pages addressed to the mobile user terminal in a sequence wherein each of the incoming call pages in the sequence includes information identifying the respective incoming call page within the sequence. Accordingly, the step of determining a period of time within which the mobile user terminal can respond to the incoming call can include determining the number of incoming call pages in the sequence to follow.

More particularly, the information identifying the respective incoming call page within the sequence can include a number that is incremented or decremented for each successive incoming call page in the sequence. In addition, the mobile user terminal can receive timing information including a time duration between each of the incoming call pages in a sequence and including a predetermined period of time after a last of the incoming call pages in a sequence within which the mobile user terminal can respond to the incoming call. Moreover, the timing information can be received as a portion of each of the incoming call pages, the timing information can be received over a control channel independent of the incoming call pages, and/or the timing information cab be programmed into mobile user terminal memory. Preferably, the timing information is received over a control channel independent of the incoming call pages.

According to an alternate aspect of the present invention, a radiotelephone communications system determines that there is an incoming call for the mobile user terminal, and transmits a predetermined number of incoming call pages addressed to the mobile user terminal in a sequence. Each of the incoming call pages in the sequence includes information allowing the user terminal to determine a period of time within which the mobile user terminal can respond to the incoming call. Accordingly, the mobile user terminal can determine the period of time available for response to the incoming call and provide this information to the user.

Methods, terminals, and systems according to the present invention thus allow the recipient of an incoming call to make an informed decision as to whether there is enough time to move from a location providing disadvantaged communications to a location providing advantaged communications in response to an incoming call. User frustration can thus be reduced.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
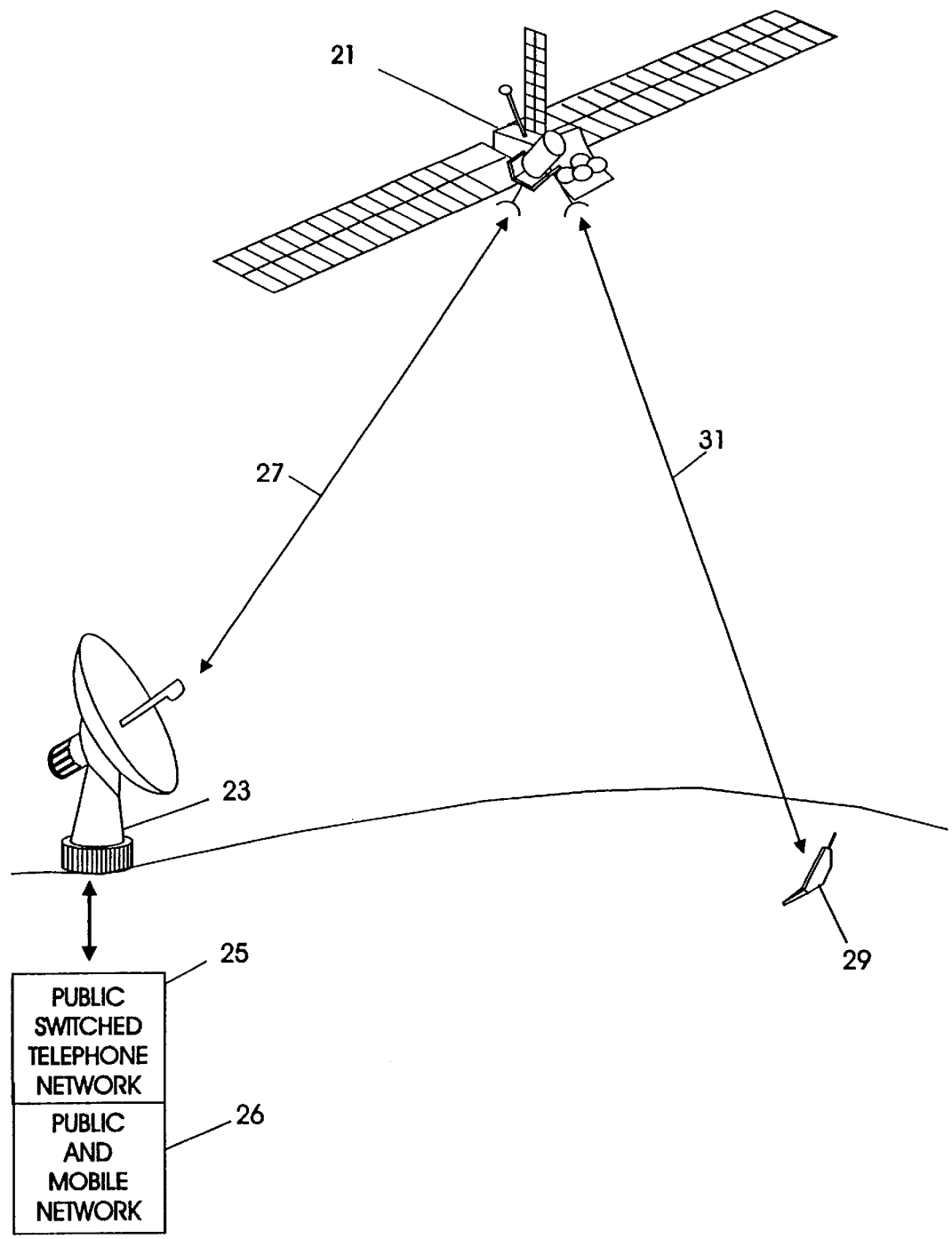
FIG. 1 illustrates a satellite communications system according to the present invention.

As shown in FIG. 1, a radiotelephone communications system according to the present invention can be implemented as a satellite communications system including at least one satellite 21 and a terrestrial controller 23 which can be coupled to a wireless communications system such as a Public Land Mobile Network (PLMN) 26, and/or to a wired communications system such as a Public Switched Telephone Network (PSTN) 25. The terrestrial controller 23 and the satellite 21 are coupled through radio links 27. The satellite 21 and at least one user terminal 29 can be coupled through radio links 31.

As will be understood by those having skill in the art, the satellite communications system can provide communications to and from a plurality of user terminals, and the satellite can provide service through a plurality of spot beams (or cells) each covering a different geographic region. Moreover, the satellite communications system can include a plurality of satellites and/or a plurality of controllers. Accordingly, the satellite communications system can facilitate communications between the mobile user terminal 29 and another mobile user terminal, or between the mobile user terminal 29 and a telephone coupled to the public switched telephone network. In addition, the user terminal can be a radiotelephone, a portable computer, a personal digital assistant, or any other electronic device adapted for radiotelephone communications.

In a satellite radiotelephone communications system according to the present invention, the communications system may establish a radiotelephone communications link with the user terminal 29 using a traffic channel via a radio link 31. For example, such a link can be established responsive to a call placed by a telephone from the PSTN 25, or the link can be established responsive to a call from another user terminal coupled to the satellite 21 or coupled to another satellite in the communications system. The link can be established by transmitting an incoming call page from a transceiver of the satellite 21 wherein the incoming call page is transmitted at a first power level. The incoming call page may be transmitted over a control channel. Upon reception of the incoming call page, the user terminal 29 acknowledges receipt thereof and a two-way radiotelephone communications link is established over a dedicated channel such as a traffic channel.

If the user terminal 29 does not receive the incoming call page or is unable to acknowledge receipt of the incoming call page within a predetermined period of time, however, the radiotelephone communications link may not be established. For example, the mobile terminal may be located inside a building such so that an incoming call page transmitted at a normal power level is not received. Accordingly, when the communications system determines that there is an incoming call for the user terminal 29, a sequence of a predetermined number of incoming call pages are transmitted spaced apart in time to increase the likelihood that at least one of the incoming call pages is received. In addition, at least one of the incoming call pages can be transmitted at a higher power level, such as over a high power alert channel (HPACH), to further increase the probability of reception by the user terminal.

The user terminal can respond to establish a radiotelephone communications link any time between the transmission of the first incoming call page of the sequence and a predetermined period of time after the transmission of the last incoming call page of the sequence. Otherwise, the communications system may assume that the user terminal 29 is not available and terminate the incoming call.

Accordingly, there may exist a situation wherein the user terminal is able to receive one of the incoming call pages (for example, transmitted over a high power alert channel) of a sequence initiated by the communications system in response to an incoming call, and wherein the user terminal is not immediately able to respond. This situation is referred to as a disadvantaged communications situation and may occur, for example, when the user terminal is in a building. A radiotelephone communications link can be established, however, if the user terminal can be moved to a location providing advantaged communications, such as by moving the user terminal outside the building, within the period of time allowed by the communications system for response.

Communications systems and methods according to the present invention facilitate this situation by providing information in each of the incoming call pages which identifies the respective incoming call page within the sequence. For example, each incoming call page can indicate how many subsequent pages are to follow in the sequence. The user terminal can use this information to determine how much time is available for the user terminal to respond to the incoming call page and establish a radiotelephone communications link, and the user terminal can provide an indication of this time to the user through a user interface either visually or audibly. For example, the indication of the time can be provided using a countdown on a digital or analog display, using an audible countdown, using a countdown on a graphical display, etc. More particularly, a predetermined number of incoming call pages can be generated in each sequence, and each incoming call page in a sequence can include a field indicating the number of incoming call pages in the sequence to follow. For example, five incoming call pages can be included in a sequence, and the field (such as a counter value) indicating the number of subsequent pages can be 4, 3, 2, 1, and 0 for the respective incoming call pages in the sequence.

Moreover, the number of incoming call pages in a sequence, the time duration between each of the incoming call pages in a sequence, and the period of time after the last call page within which a response from the user terminal will be accepted are system parameters that can be provided to the user terminal. Accordingly, the user terminal can use this information together with the number of subsequent pages to determine the total period of time within which the user terminal can respond to the incoming call to establish a radiotelephone communications link. This period of time can be provided through a user interface to the user of the user terminal who can then decide if there is enough time to move to a location providing advantaged communications. Accordingly, the frustration of moving to a location providing advantaged communications only to learn that the time allowed for response has expired can be reduced.

The communications system parameters including the number of incoming call pages in a sequence, the time duration between each of the incoming call pages, and the time period after the last page in a sequence during which a response will be accepted can be saved in user terminal memory. These system parameters can be programmed into the user terminal memory when a service account is established for the user terminal, or these system parameters can be transmitted by the communications system such as over a control channel. Alternately, some or all of these parameters can be provided to the user terminal as part of the incoming call pages. By transmitting these parameters, system changes can be accomplished without reprogramming user terminals.

Figure 2:
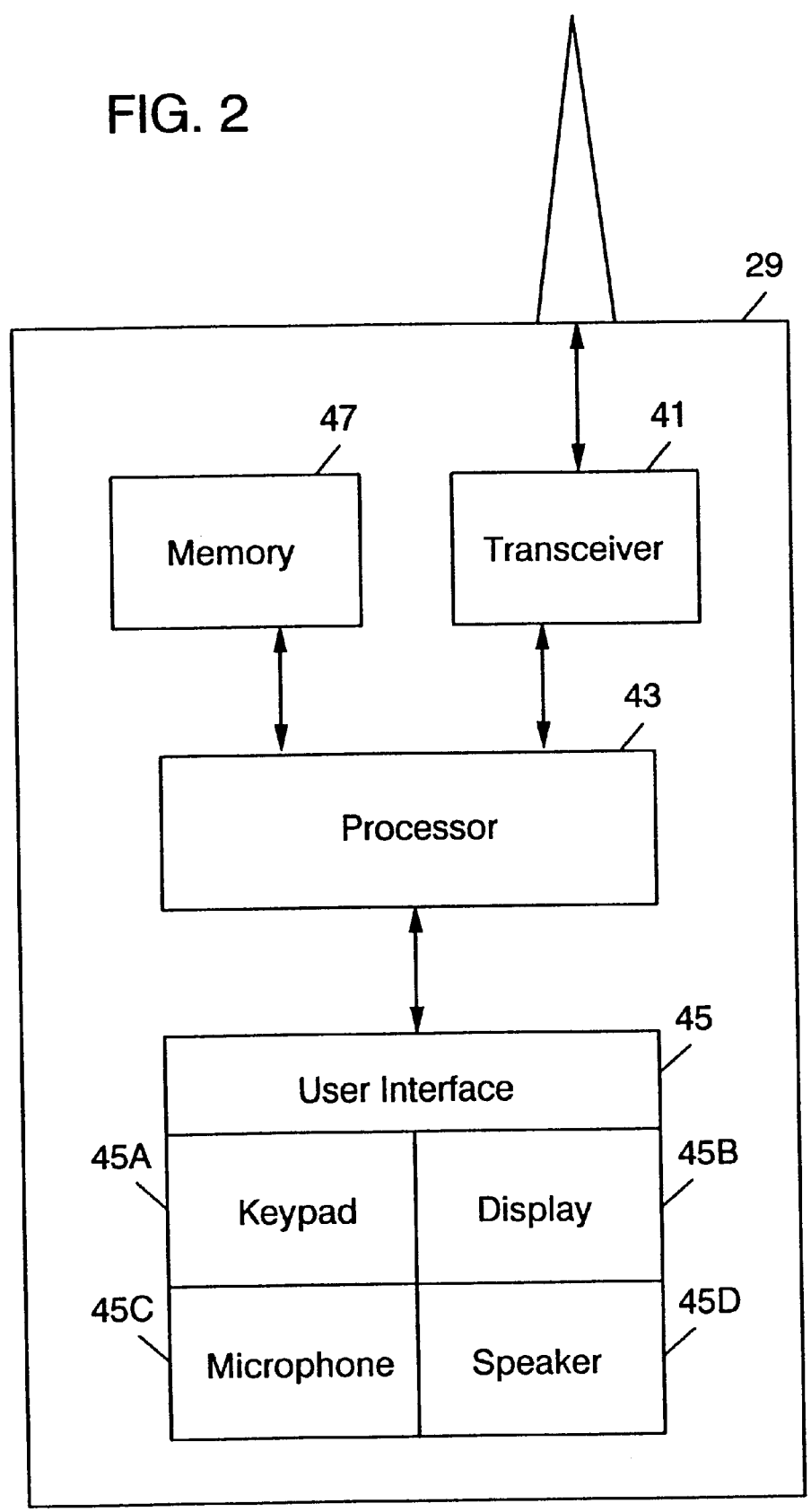
FIG. 2 is a block diagram illustrating a mobile user terminal according to the present invention.

A block diagram of a user terminal according to the present invention is illustrated in FIG. 2. As shown, the user terminal includes a transceiver 41 which receives radiotelephone communications from the communications system at the first power level and which transmits communications to the communications system as is known. The transceiver can also receive incoming call pages from the communications system at a second power level higher than the normal power level. Accordingly, the transceiver 41 can receive incoming call pages from the radiotelephone communications system at both normal and high power levels. In particular, high power level incoming call pages can be received over a high power alert channel.

A processor 43 is coupled to the transceiver 41 so that the processor can process communications transmitted and received by the transceiver. More particularly, the processor can process any incoming call pages addressed to the user terminal and generate a notification signal such as a ringing through the user interface 45 to notify the user that there is an incoming call. If the user terminal is in a location providing advantaged communications, such as outside, the user terminal can respond immediately to establish a two way radiocommunications link. If, however, the user terminal is in a location providing disadvantaged communications, such as inside a building, the processor can determine a period of time within which the user terminal can respond to the incoming call and provide this time to the user through the user interface 45.

The user interface 45 is coupled to the processor 43, and the user interface can include a keypad 45A; a visual display 45B such as a liquid crystal display (LCD), a light emitting diode (LED) display, and/or an alpha-numeric display; a microphone 45C; and a speaker 45D. More particularly, the user interface 45 can provide notification to the user that an incoming call page has been received and as well as the period of time within which the user terminal can respond to the incoming call page. For example, the period of time for response can be provided audibly using the speaker 45D or other audio generating means, or visually using display 45B. The time itself does not need to be provided. Alternatively, an indication of the time can be provided, for example, using a graphical display.

The user terminal can also include a memory 47 coupled with the processor 43. The memory 47 can be used to store timing information relating to the sequence of the incoming call pages. In particular, the memory 47 can be used to store time durations between incoming call pages within a sequence, as well as a predetermined period of time after the last page of a sequence within which the user terminal can respond to establish a radiotelephone communications link. The processor 43 can thus use information from a received incoming call page together with the timing information stored in memory 47 to determine the period of time within which the user terminal can respond to the incoming call. Moreover, this determination can be made even when only one incoming call page of a sequence is received because the received incoming call page includes information indicating how many subsequent pages of the sequence are to follow.

As will be appreciated by those of skill in the art, the above described aspects of the present invention in FIG. 2 may be provided by hardware, software, or a combination of the above. While various components of the apparatus of the present invention have been illustrated in part as discrete elements in the FIG., they may, in practice, be implemented by a microcontroller including input and output ports and running software code, by custom or hybrid chips, by discrete components or by a combination of the above. In particular, the memory 47 and the processor 43 may be implemented as a segment of existing memory and additional code executing on an existing processor of the user terminal respectively.

Figure 3:
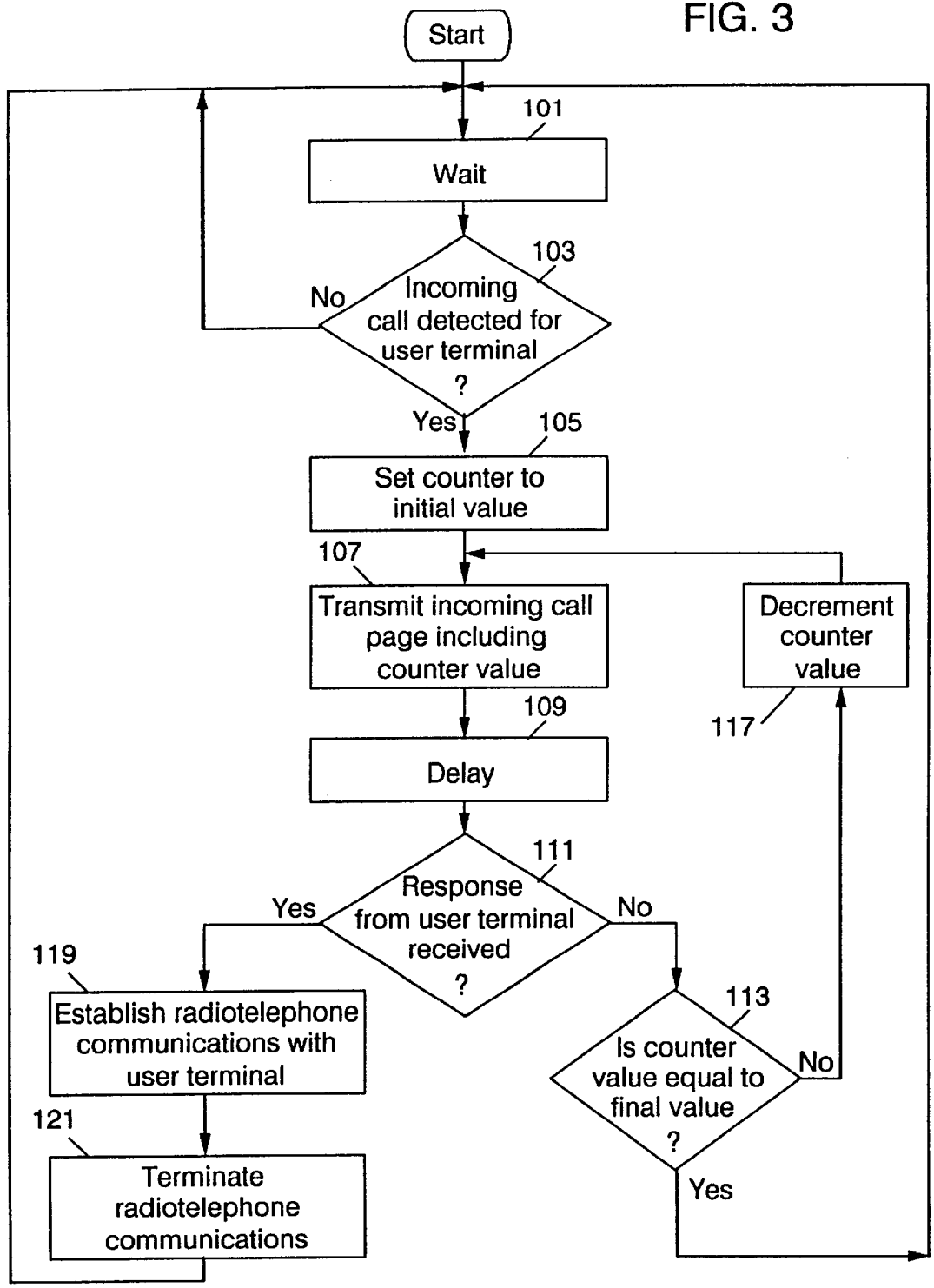
FIG. 3 is a flow chart illustrating operations of a communications system according to the present invention.

Operations of a radiotelephone communications system according to one aspect of the present invention are illustrated in the flow chart of FIG. 3. As shown, the radiotelephone system waits at block 101 until an incoming call is detected for a user terminal 29 at block 103. Upon detection of an incoming call, a sequence counter is set to an initial value at block 105. For example, the sequence counter can be initially set to a number equal to one less than the number of incoming call pages transmitted in a sequence in response to an incoming call. By sending the counter value with each of the incoming call pages, and decrementing the counter value after each incoming call page, the counter value transmitted with each incoming call page in a sequence will indicate the number of incoming call pages to follow in the sequence. Furthermore, the Asia Cellular Satellite System Air Interface Specification currently provides three unused bits in the data format for the incoming call page, and these bits can be used to accommodate the transmission of the counter value.

The first incoming call page including the counter value at the initial value is transmitted at block 107, and if no response is received from the user terminal at block 111, the counter value is checked to against the final counter value at block 113. In addition, a delay for a predetermined period of time is provided at block 109 between each of the incoming call pages transmitted in the sequence. If the counter value is not equal to the final value at block 113, the counter value is decremented at block 117 before the transmission of the next incoming call page in the sequence with the decremented counter value at block 107. This loop continues until either a response is received from the user terminal 29 being paged at block 111, or until all incoming call pages of the sequence have been sent without response from the user terminal as determined at block 113.

If a response is received from the user terminal 29 within the period of time required for response at block 111, a radiotelephone communications link is established at block 119. When the call is completed, the radiotelephone communications link is terminated as block 121, and operations go back to the wait operation at block 101. The period of time for the delay at block 109 can be the same or vary between each of incoming call pages in a sequence. The delay at block 109 also provides a period of time after the last incoming call page of a sequence within which the user terminal can respond to establish a radiotelephone communications link. This final delay can be the same as or different from the preceding delays. For example, each of the delays between pages in a sequence can be the same, and the period for response after the last page can be longer than the delay between pages. Hence, the delays of block 109 can be configured so that information including the duration of one delay can be used by the user terminal to determine all of the delays. For example, predetermined correlations between the delays can be provided so that only one delay duration needs to be provided to the user terminal in order for the user terminal to determine all of the delays.

Accordingly, the user terminal can use the counter value transmitted with any of the incoming call pages to determine how many subsequent pages in the sequence will follow, and how much time is available to respond to the incoming call to establish a radiotelephone communications link through the radiotelephone communications system. More particularly, the user terminal 29 can use the counter value transmitted with an incoming call page together with the delays between each page in a sequence and the period of time after the last page in a sequence to determine the time available for a response. By providing an indication of the time available for a response to the user, the user can decide if there is sufficient time to move from a disadvantaged communications location to an advantaged communications location to receive the call. Moreover, the duration of each delay between pages of a sequence, and/or the duration of the period of time after the last page within which the user terminal can respond can be transmitted by the radiotelephone communications system. This information can be transmitted as part of each incoming call page or over a control channel independent of the incoming call pages. Alternately, this information can be programmed in user terminal 29 memory 47.

Figure 4:
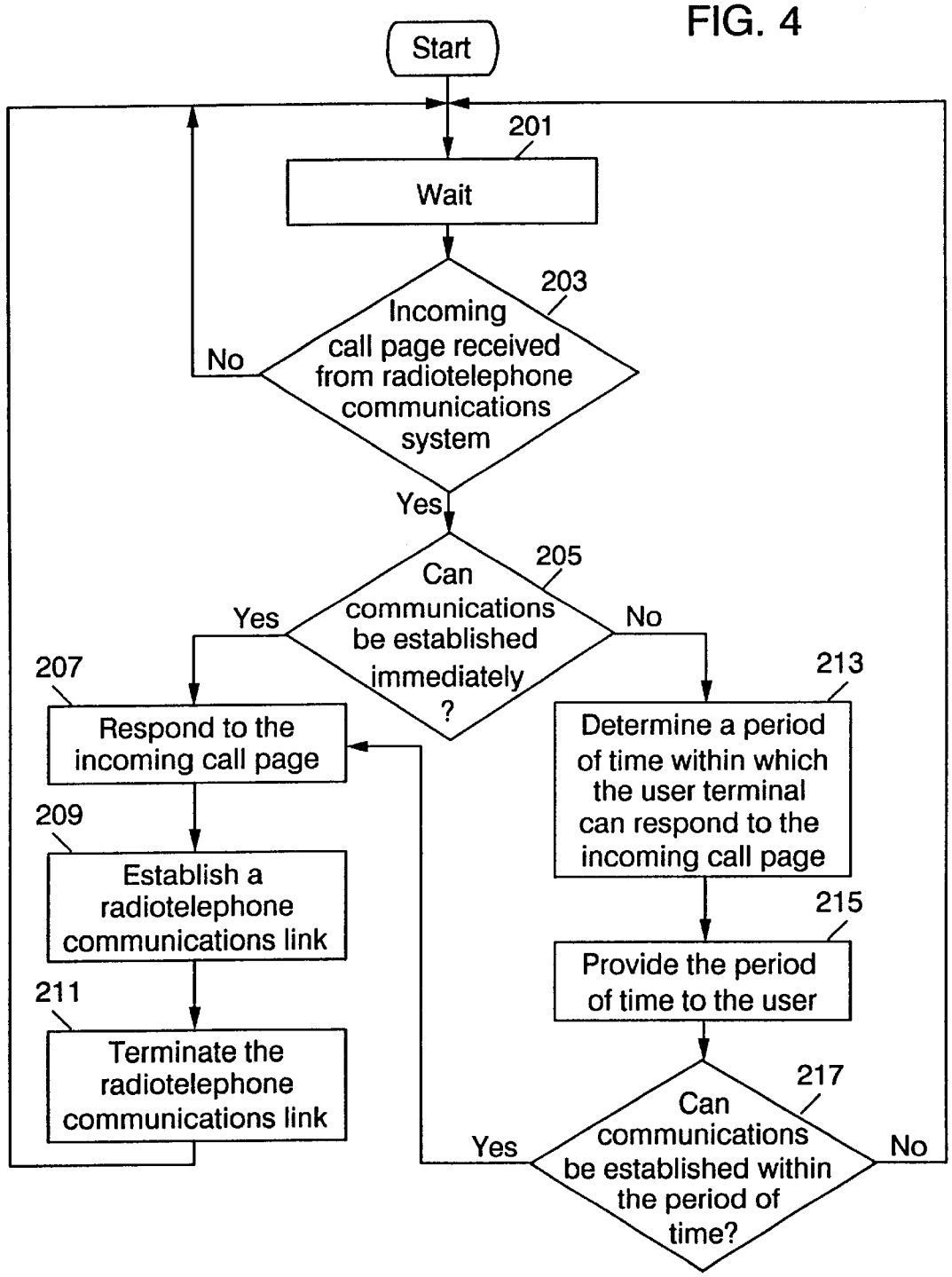
FIG. 4 is a flow chart illustrating operations of a user terminal according to the present invention.

Operations of a user terminal 29 according to another aspect of the present invention are illustrated in the flowchart of FIG. 4. As shown in FIG. 4, the user terminal 29 waits at block 201 until an incoming call page is received from the radiotelephone communications system at block 203. When the incoming call page is received, the user terminal 29 determines whether a two way radiotelephone communications link can be established immediately at block 205. If the user terminal is in a location providing advantaged communications, such as outside with a relatively unobstructed radio path to the communications system, the user terminal can inform the user of the incoming call and respond immediately to the incoming call page at block 207. Accordingly, a two-way radiotelephone communications link can be established with the communications system at block 209 to support a radiotelephone call. When the call is completed, the radiotelephone communications link can be terminated at block 211, and the user terminal 29 again waits at blocks 201 and 203 for the next incoming call page.

The user terminal 29, however, may be unable to establish communications immediately with the radiotelephone communications system at block 205. For example, the user terminal 29 may be located in a location providing only disadvantaged communications, such as in a building, so that an obstructed radio path is provided between the user terminal and the radiotelephone communications system. More particular, the communications system can generate a sequence of incoming call pages responsive to an incoming call, and one or more of these pages may be transmitted at a relatively high power such as over a high power alert channel (HPACH).

When in a location providing disadvantaged communications, the user terminal 29 may be unable to receive an incoming call page transmitted at a normal power level, and the user terminal 29 may be unable to send transmissions to the communications system. The user terminal 29 may, however, be able to receive an incoming call page transmitted at a relative high power, such as over a high power communications channel. Upon receipt of a high power page in this situation, the user terminal 29 can use information from the page to determine the period of time available to respond to the incoming call at block 213. An indication of the period of time can be provided to the user through the user interface 45 at block 215. In addition, this period of time can be entered in a processor timer so that a countdown is provided to the user. Moreover, the countdown can be provided alpha-numerically to the user through a visual interface such as a liquid crystal display or a light emitting diode display.

Accordingly, the user can decide whether or not there is sufficient time to move to a location providing advantaged communications such as outside the building. If the user terminal 29 is moved to the position providing advantaged communications within the period of time allowed for response so that communications can be established at block 217, a response is transmitted to the radiotelephone communications system at block 207, and a radiotelephone communications link is established at block 209 to support a radiotelephone call. When the radiotelephone call is completed, the radiotelephone communications link is terminated at block 211, and the user terminal waits for the next incoming call page at blocks 201 and 203.

As discussed above, the user terminal 29 is provided with information including the number of pages in an incoming call page sequence, the duration of the delays between each page in the sequence, and the period of time after the last page in a sequence within which the user terminal can respond to an incoming call. This information can be provided by the radiotelephone communications system as a portion of each of the incoming call pages, or this information can be provide by the radiotelephone communications independently of the incoming call pages. For example, this information can be transmitted over a control channel and stored in user terminal memory. Alternately, this information can be programmed into user terminal memory when a service account with the radiotelephone communications system is established for the user terminal or a combination of these two methods can be used. Accordingly, this information can be used together with the counter value included in the incoming call pages to determine a period of time available for the user terminal to respond to the incoming call.

As an example, a radiotelephone communications can generate a sequence of five incoming call pages when it is determined that there is an incoming call for a particular user terminal, and the third incoming call page of each sequence can be transmitted over a high power alert channel to increase the probability of reception at the user terminal. Moreover, each incoming call page can include an international mobile station identity (IMSI) identifying the user terminal, and a counter value. In particular, the counter value can be decremented from 4 to 3 to 2 to 1 to 0 respectively for the first to the last of the five incoming call pages of the sequence.

In addition, radiotelephone communications system parameters allowing determination of the delay between each of the pages and the period or time after the last page within which the user terminal can respond are stored in the user terminal memory. For the purposes of this example, the duration of the delay between each of the pages is 20 seconds, and the period of time after the last page within which the user terminal can respond is 1 minute. Furthermore, the user terminal is positioned at a disadvantaged location so that only the third incoming call page of the sequence transmitted over the high power alert channel is received by the user terminal.

Because the third incoming call page includes a counter value which has been decremented to 2 indicating that there will be two subsequent pages in the sequence, the user terminal processor can multiply the duration of the delay between pages (20 seconds) by two and add the period of time after the last page within which the user terminal can respond (1 minute) to determine that the user has 1 minute and 40 seconds to move to a location providing advantaged communications and respond to the incoming call. In addition, the user terminal can provide an indication of this period of time to the user through a user interface such as a liquid crystal display. The user terminal can further load this time period into a timer and provide a countdown to the user through the liquid crystal display. Accordingly, once a single incoming call page is received, the user can be informed how much time is available to move to a location providing advantaged communications. The user can thus make an informed decision as to whether or not it is worth while to move to the position providing advantaged communications. Frustration can thus be reduced as the user is less likely to move to another location to receive a call only to learn once there that the time available for a response has elapsed. Also, by knowing the total allowed response time and the end of a page sequence, the user terminal can miss a particular page of the sequence (for example, while being relocated) without terminating the call process).

While particular numbers of pages in a sequence, delays between pages in a sequence, and periods of time after a sequence of pages within which a response can be accepted have been discussed for purposes of illustration, it will be understood that user terminals, systems and methods according to the present invention can be provided to accommodate varying numbers of pages in a sequence, varying delays, and varying time periods. Moreover, while a common delay has been discussed between each of the pages of a sequence, delays between different pages of a sequence can be different.

The present invention has been described above with respect to FIGS. 3 and 4 with reference to flowcharts illustrating operations of the present invention. It will be understood that each block of the flowchart, and combinations of blocks in the flowchart, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims. While the present invention has been discussed above with reference to a satellite radiotelephone communications system, the methods, systems, and terminals of the present invention can also be applied in a terrestrial cellular radiotelephone communications system. The methods, systems, and terminals of the present invention can also be applied with dual mode terminals capable of providing communications with both satellite radiotelephone communications systems and terrestrial radiotelephone communications systems.

That which is claimed is:

1. A method of processing a radiotelephone incoming call page from a radiotelephone communications system at a user terminal indicating an incoming call for the user terminal, the method comprising the steps of:

receiving the radiotelephone incoming call page from the radiotelephone communications system at the user terminal;

determining at the user terminal a period of time within which the user terminal can respond to the incoming call; and providing at the user terminal an indication of the period of time within which the user terminal can respond to the incoming call to a user of the user terminal.

2. A method according to claim 1 further comprising the steps of:

transmitting a response from the user terminal responsive to the incoming call during the period of time within which the user terminal can respond to the incoming call; and establishing a radiotelephone communications link between the user terminal and the radiotelephone communications system.

3. A method of processing an incoming call page from a radiotelephone communications system at a user terminal indicating an incoming call for the user terminal, the method comprising the steps of:

receiving the incoming call page from the radiotelephone communications system at the user terminal wherein the incoming call page is one of a predetermined number of incoming call pages addressed to the user terminal in a sequence wherein each of the incoming call pages in the sequence includes information identifying the respective incoming call page within the sequence;

determining a period of time within which the user terminal can respond to the incoming call wherein the step of determining a period of time within which the user terminal can respond to the incoming call includes determining the number of incoming call pages in the sequence to follow; and providing an indication of the Period of time within which the user terminal can respond to the incoming call to a user of the user terminal.

4. A method according to claim 3 wherein the information identifying the respective incoming call page within the sequence comprises a number that is decremented for each successive incoming call page in the sequence.

5. A method according to claim 3 further comprising the step of:

receiving timing information which allows a determination of a time duration between each of the incoming call pages in a sequence and a period of time after a last of the incoming call pages in a sequence within which the user terminal can respond to the incoming call.

6. A method according to claim 5 wherein the timing information is received as a portion of each of the incoming call pages.

7. A method according to claim 5 wherein the timing information is received over a control channel independent of the incoming call pages.

8. A method according to claim 5 wherein the timing information is programmed into user terminal memory.

9. A method according to claim 3 wherein at least one of the incoming call pages is received at a higher power level than another one of the incoming call pages.

10. A method of transmitting pages indicating an incoming call for a user terminal, the method comprising the steps of:

determining that there is an incoming call for the user terminal; and transmitting a predetermined number of radiotelephone incoming call pages addressed to the user terminal in a sequence wherein each of the radiotelephone incoming call pages in the sequence includes information allowing the user terminal to determine a period of time within which the user terminal can respond to the incoming call.

11. A method according to claim 10 further comprising the step of:

establishing a radiotelephone communications link with the user terminal when a response from the user terminal is received between transmission of a first incoming call page of the sequence and a predetermined period of time after transmission of a last incoming call page of the sequence.

12. A method according to claim 10 further comprising the step of:

not establishing a radiotelephone communications link with the user terminal when a response from the user terminal is received after a predetermined period of time after transmission of a last incoming call page of the sequence.

13. A method according to claim 10 wherein at least one of the incoming call pages is transmitted at a higher power level than another one of the incoming call pages.

14. A method of transmitting pages indicating an incoming call for a user terminal, the method comprising the steps of:

determining that there is an incoming call for the user terminal; and transmitting a predetermined number of incoming call pages addressed to the user terminal in a sequence wherein each of the incoming call pages in the sequence includes information allowing the user terminal to determine a period of time within which the user terminal can respond to the incoming call wherein the information identifies the respective incoming call page within the sequence.

15. A method according to claim 14 wherein the information identifying the respective incoming call page within the sequence comprises a number that is decremented for each successive incoming call page in the sequence.

16. A method of transmitting pages indicating an incoming call for a user terminal, the method comprising the steps of:

determining that there is an incoming call for the user terminal;

transmitting a predetermined number of incoming call pages addressed to the user terminal in a sequence wherein each of the incoming call pages in the sequence includes information allowing the user terminal to determine a period of time within which the user terminal can respond to the incoming call; and transmitting timing information which allows a determination of a time duration between each of the incoming call pages in a sequence and a period of time after a last of the incoming call pages in a sequence within which the user terminal can respond to the incoming call.

17. A method according to claim 16 wherein the timing information is transmitted as a portion of each of the incoming call pages.

18. A method according to claim 16 wherein the timing information is transmitted over a control channel independent of the incoming call pages.

19. A mobile user terminal for providing radiotelephone communications through a radiotelephone communications system, the mobile user terminal comprising:

a transceiver that receives a radiotelephone incoming call page from the radiotelephone communications system at the mobile user terminal wherein the radiotelephone incoming call page indicates an incoming call for the user terminal;

a processor coupled to the transceiver that determines a period of time within which the user terminal can respond to the incoming call; and a user interface coupled to the processor that provides to a user an indication of the period of time within which the user terminal can respond to the incoming call.

20. A mobile user terminal according to claim 19 wherein a response to the incoming call is generated by the processor and transmitted by the transceiver during the period of time within which the user terminal can respond to the incoming call to establish a radiotelephone communications link between the user terminal and the radiotelephone communications system.

21. A mobile user terminal for providing radiotelephone communications through a radiotelephone communications system, the mobile user terminal comprising:

a transceiver that receives the incoming call page from a base station at the mobile user terminal wherein the incoming call page is one of a predetermined number of incoming call pages addressed to the user terminal in a sequence wherein each of the incoming call pages in the sequence includes information identifying the respective incoming call page within the sequence;

a processor coupled to the transceiver that determines a period of time within which the user terminal can respond to the incoming call wherein the processor determines a period of time within which the user terminal can respond to the incoming call by determining the number of incoming call pages in the sequence to follow; and a user interface coupled to the processor that provides to a user an indication of the period of time within which the user terminal can respond to the incoming call.

22. A mobile user terminal according to claim 21 wherein the information identifying the respective incoming call page within the sequence comprises a number that is decremented for each successive incoming call page in the sequence.

23. A mobile user terminal according to claim 21 wherein the processor obtains timing information which allows a determination of a time duration between each of the incoming call pages in a sequence and a period of time after a last of the incoming call pages in a sequence within which the user terminal can respond to the incoming call.

24. A mobile user terminal according to claim 23 wherein the timing information is received as a portion of each of the incoming call pages.

25. A mobile user terminal according to claim 23 wherein the timing information is received over a control channel independent of the incoming call pages.

26. A mobile user terminal according to claim 23 further comprising:

a memory coupled to the processor wherein the timing information is stored in the memory.

27. A mobile user terminal according to claim 21 wherein at least one of the incoming call pages is received at a higher power level than another one of the incoming call pages.

28. A radiotelephone communications system for providing radiotelephone communications with a mobile user terminal, the radiotelephone communications system comprising:

a transceiver that transmits and receives radiotelephone communications to and from the user terminal; and a controller coupled to the transceiver that determines that there is an incoming call for the user terminal, and wherein the controller generates a predetermined number of radiotelephone incoming call pages addressed to the user terminal in a sequence responsive to the incoming call wherein each of the radiotelephone incoming call pages in the sequence includes information allowing the user terminal to determine a period of time within which the user terminal can respond to the incoming call, and wherein the radiotelephone incoming call pages are transmitted through the transceiver.

29. A radiotelephone communications system according to claim 28 wherein the controller establishes a radiotelephone communications link with the user terminal when a response from the user terminal is received between transmission of a first incoming call page of the sequence and a predetermined period of time after transmission of a last incoming call page of the sequence.

30. A radiotelephone communications system according to claim 28 wherein the controller does not establishing a radiotelephone communications link with the user terminal when a response from the user terminal is received after a predetermined period of time after transmission of a last incoming call page of the sequence.

31. A radiotelephone communications link according to claim 28 wherein at least one of the incoming call pages is transmitted at a higher power level than another one of the incoming call pages.

32. A radiotelephone communications system for providing radiotelephone communications with a mobile user terminal, the radiotelephone communications system comprising:

a transceiver that transmits and receives radiotelephone communications to and from the user terminal; and a controller coupled to the transceiver that determines that there is an incoming call for the user terminal, and wherein the controller generates a predetermined number of incoming call pages addressed to the user terminal in a sequence responsive to the incoming call wherein each of the incoming call pages in the sequence includes information allowing the user terminal to determine a period of time within which the user terminal can respond to the incoming call, and wherein incoming call pages are transmitted through the transceiver wherein the information identifies a number of the incoming call pages in the sequence to follow.

33. A radiotelephone communications system according to claim 32 wherein the information identifying the respective incoming call page within the sequence comprises a number that is decremented for each successive incoming call page in the sequence.

34. A radiotelephone communications system for providing radiotelephone communications with a mobile user terminal, the radiotelephone communications system comprising:

a transceiver that transmits and receives radiotelephone communications to and from the user terminal; and a controller coupled to the transceiver that determines that there is an incoming call for the user terminal, and wherein the controller generates a predetermined number of incoming call pages addressed to the user terminal in a sequence responsive to the incoming call wherein each of the incoming call pages in the sequence includes information allowing the user terminal to determine a period of time within which the user terminal can respond to the incoming call, and wherein incoming call pages are transmitted through the transceiver wherein the controller generates timing information which allows a determination of a time duration between each of the incoming call pages in a sequence and a period of time after a last of the incoming call pages in a sequence within which the user terminal can respond to the incoming call, and wherein the timing information is transmitted by the transceiver.

35. A radiotelephone communications system according to claim 34 wherein the timing information is transmitted as a portion of each of the incoming call pages.

36. A radiotelephone communications system according to claim 34 wherein the timing information is transmitted over a control channel independent of the incoming call pages.

* * * * *